United States Patent [19]

Crosby

[11] Patent Number: 5,311,607
[45] Date of Patent: May 10, 1994

[54] FACSIMILE MACHINE FOR PRINTING DOCUMENTS ALL WITH CORRESPONDING EDGES ALIGNED BUT WITHOUT REQUIRING SCANNING

[76] Inventor: Peter A. Crosby, 9603 E. Orchard Dr., Greenwood Village, Colo. 80111

[21] Appl. No.: 111,544

[22] Filed: Aug. 25, 1993

[51] Int. Cl.⁵ ............................................. G06K 9/32
[52] U.S. Cl. .................................... 382/46; 382/18; 358/488; 358/462
[58] Field of Search .............. 358/488, 496, 462; 382/16, 46, 48, 61, 18

[56] References Cited

U.S. PATENT DOCUMENTS

| | | | |
|---|---|---|---|
| 4,186,415 | 1/1980 | Takayama | 358/260 |
| 4,225,888 | 9/1980 | Takayama et al. | 358/288 |
| 4,491,873 | 1/1985 | Takayama | 358/256 |
| 4,642,700 | 2/1987 | Ohta et al. | 358/285 |
| 4,710,951 | 12/1987 | Itezono | 379/100 |
| 4,747,149 | 5/1988 | Umeda | 382/18 |
| 4,941,195 | 7/1990 | Tanaka | 382/61 |
| 4,998,285 | 3/1991 | Suzuki | 382/9 |
| 5,021,890 | 6/1991 | Yoshida et al. | 358/405 |
| 5,073,954 | 12/1991 | Van Tyne | 382/18 |
| 5,101,287 | 3/1992 | Akuzawa | 358/496 |
| 5,123,062 | 6/1992 | Sangu | 382/57 |
| 5,131,053 | 7/1992 | Bernzott et al. | 382/9 |
| 5,132,808 | 7/1992 | Higuchi et al. | 358/403 |
| 5,133,026 | 7/1992 | Fujiwara | 382/61 |
| 5,142,161 | 8/1992 | Brackmann | 250/566 |
| 5,151,952 | 9/1992 | Canu et al. | 382/29 |
| 5,191,438 | 3/1993 | Katsurada et al. | 358/426 |
| 5,202,774 | 4/1993 | Ishimitsu | 358/488 |

*Primary Examiner*—Edward L. Coles, Sr.
*Assistant Examiner*—John Ning
*Attorney, Agent, or Firm*—Gottlieb, Rackman & Reisman

[57] ABSTRACT

A facsimile machine which will print documents which have their corresponding edges aligned. Incoming data is stored in memory. A line of text, as it is bit mapped in memory, is identified. Line scans are taken through the upper and lower regions of the text line. Whichever group has the higher average density is the group associated with the tops of the characters. To print the document, data is read out of the memory in the order in which it was received, or in the reverse order, such that an "up side down" document is reoriented. A determination of the order in which printing should take place is made without requiring the actual recognition of any characters.

10 Claims, 5 Drawing Sheets

FIG. 1
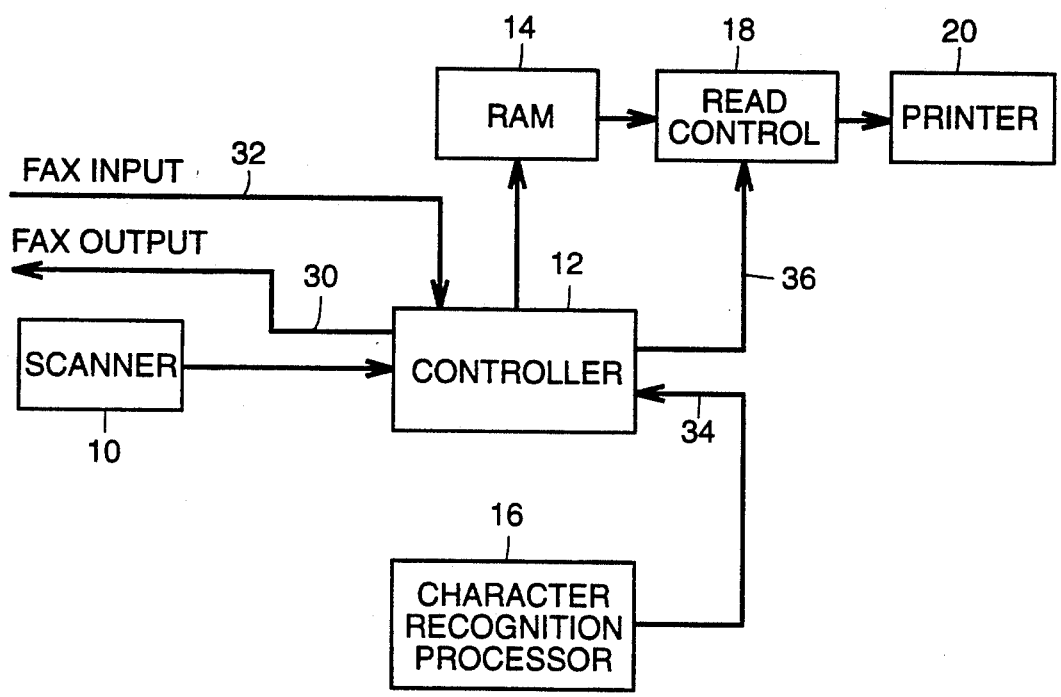
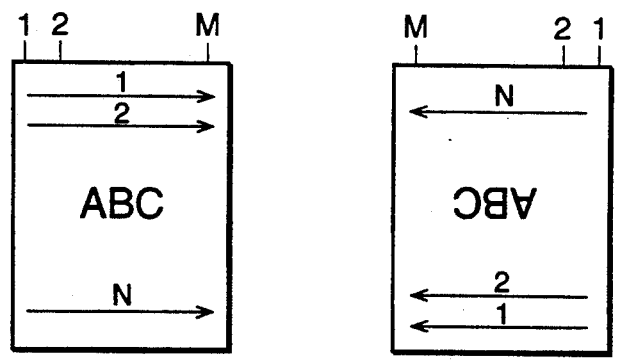
FIG. 2  FIG. 3

FACSIMILE MACHINE FOR PRINTING DOCUMENTS ALL WITH CORRESPONDING EDGES ALIGNED BUT WITHOUT REQUIRING SCANNING

This invention relates to a facsimile machine for printing documents all with corresponding edges aligned independent of whether individual documents were transmitted top or bottom edge first, but without requiring the execution of a scanning routine in the receiver.

In application Ser. No. 972,611, filed on Nov. 6, 1992 in the name of Michael I. Rackman, there is disclosed a facsimile machine for printing documents all with corresponding edges aligned independent of whether individual documents were transmitted top or bottom edge first. Most facsimile machines are already equipped with sufficient memory to store data representative of a complete document. In the '611 machine, the data representative of a received document is stored in memory. Conventional image and character recognition software is then used for determining whether the document (i.e., data representing the document) came in top first or bottom first.

This is accomplished by using character recognition software to scan the document, as it is mapped in the memory, in two different ways—top down and left to right, and bottom up and right to left. One of the two scanning sequences will result in recognizable characters. (On the off chance that they both do, the one with more recognizable characters is the "winner.") The stored data is then read out of the memory and used to control the printer. If a document came in top edge first, then the data is read out in the same order. If the document came in bottom edge first, then the data is read out in reverse order. In either case, all documents are printed top edge first.

The above-described scheme relies on scanning software for recognizing individual characters. It is an object of the present invention to provide a method which allows the orientation of the document (as mapped in memory) to be determined without the use of scanning software and the recognition of individual characters, yet which ensures that all documents are printed with aligned edges.

The present invention is predicated on the observation that if line scans are made through a single line of character text, the average densities of the line scans through the tops of the characters will be greater than the average densities of the line scans through the bottoms of the characters. The average density of an individual line scan is a function of how many dark pixels (incremental areas) the line passes through. Certain letters in the English alphabet have risers and certain letters have descenders. The terms "risers" and "descenders" refer to those parts of letters which are respectively above and below the bodies of the letters. For example, the letters t, h and l have risers, while the letters g and j have descenders. (The dot at the top of the j can also be considered as a riser.) Because there are more letters with risers than descenders, and because the letters with descenders do not appear as frequently in text as do those with risers, a typical line of text will have scan lines with higher densities at the top of the line than at the bottom. Thus to determine the orientation of a page, all that has to be done is to isolate a line of text, whose pixels are represented in memory, and to compute one or more scan line densities along the two bounds of the line of text. The group of line scans which has the highest overall density is associated with the top of the page.

Further objects, features and advantages of the invention will become apparent upon consideration of the following detailed description in conjunction with the drawing, in which:

FIGS. 1-3 are the same as the corresponding figures in the above-identified '611 application;

Figure 9:
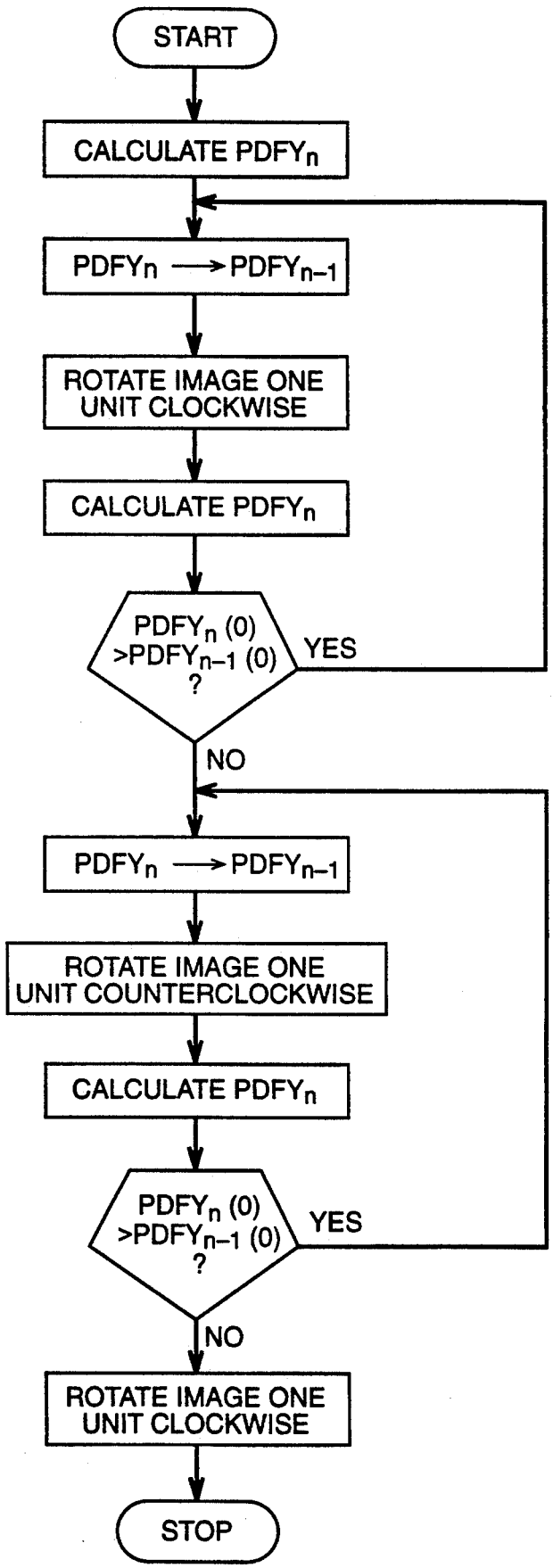
Figure 10:
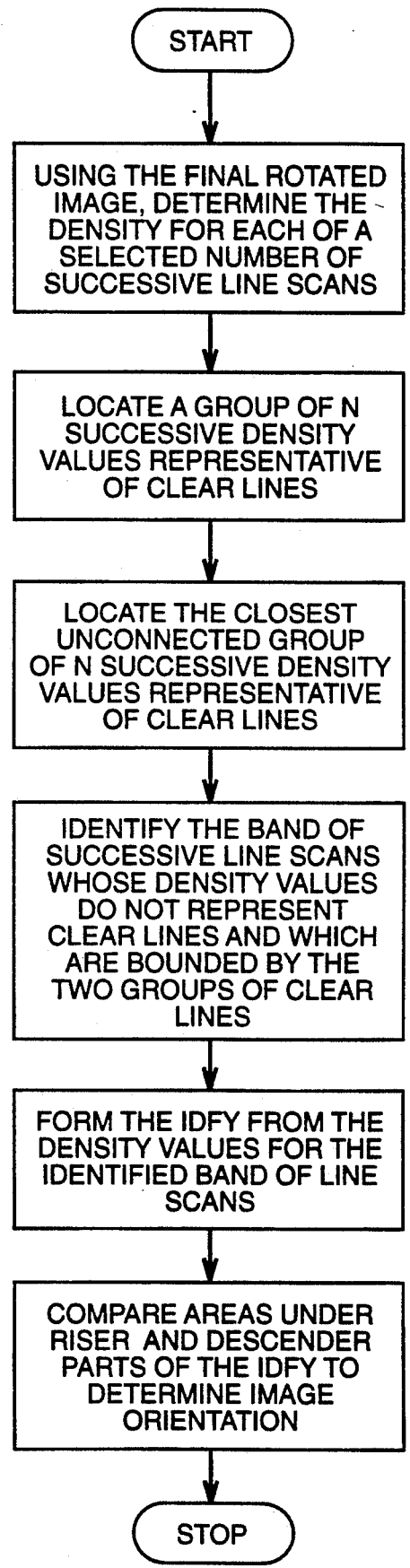

FIG. 9 is a flow chart which depicts preliminary processing in the illustrative embodiment of the invention, namely, the way in which the orientation of a document in memory is adjusted so that the lines of text are made horizontal; and FIG. 10 is a flow chart depicting the processing in accordance with the illustrative embodiment of the subject invention by which the orientation of a document is determined without requiring the recognition of individual characters.

In the system of FIG. 1, character recognition is the basis for determining document orientation. Both transmitting and receiving functions are governed by controller 12, typically a microprocessor. A document to be transmitted is scanned by scanner 10, and controller 12 transmits the data over fax output line 30. The subject embodiment does not concern the transmit mode. (One day, there may be a standard by which the transmitter tells the receiver whether a document is being sent top first or bottom first, with a receiver then perhaps reorienting documents as appropriate.) The subject embodiment concerns operations in the receive mode, with data incoming over line 32.

Incoming data, or a representation of it, is stored in RAM memory 14. A typical fax machine has sufficient memory available to store a full page. (For example, if the same document is to be transmitted to many other machines, then rather than to scan it repetitively, the data can be stored in memory 14 and read out repetitively.) The data stored in RAM 14 is accessed by character recognition processor 16 through controller 12. Although shown as a separate processor, it is to be understood that the function of block 16 is accomplished by software, just as software governs the operation of controller 12. The character recognition processor determines whether an incoming document arrived top first or bottom first. Once that determination has been made, the controller is informed over line 34. The controller then causes the stored data to be read out of memory 14 by read control circuit 18. A command sent over line 36 controls reading to take place either in the same order in which data was stored, or in the reverse order, as will be described in connection with FIGS. 2 and 3. The data thus read is delivered to printer 20 which prints the document in a conventional manner.

It is thus apparent that the system of FIG. 1 utilizes the same hardware as is found in a present-day facsimile machine except for the addition of some software. The software, typically in the form of read only memory, can be provided at very little additional expense.

FIG. 2 shows a typical document which arrives top edge first. As shown, the document is scanned (at the transmitter which sends data to fax input line 32) from left to right, and top to bottom. Successive scan lines are numbered 1—N, and it is assumed that there are M pixels on each line numbered 1—M from left to right. The incoming data is processed and a representation of it is stored in memory 14 in the order in which it is received.

FIG. 3 shows an "up side down" document, with scanning taking place in the reverse direction. The scan lines are still numbered 1—N, they now effectively scan the document from bottom to top, and right to left. The two serial data streams which result from the scan sequences of FIGS. 2 and 3 are opposites of each other (first-to-last versus last-to-first) and, as depicted by the letters ABC, provide identical data streams if the two documents have opposite orientations.

Once the data is stored in memory from scanning of the type depicted in FIG. 2, if the data is read out in the same order, then the document will be oriented in the same way it was scanned by the original transmitter. If the top edge was transmitted first, it will be printed first. On the other hand, if the document is read from memory 14 in the reverse order, as shown in FIG. 3, then the last edge received will be printed first. This means that if the bottom edge was transmitted first, the top edge will be printed first. The net result is that all documents are oriented the same way in the output bin of the printer.

Let us assume that a document as shown in FIG. 2 is received over the fax input line 32. In other words, the transmitter sent the top edge first. When the character recognition processor scans the data in memory 14 in the same order and "recognizes" the letters ABC, it knows that by reading out the data in the same order in which it was received, the top edge of the document will be printed first.

On the other hand, suppose that the bottom edge was transmitted first. The data stored in memory 14, if mapped to the document, depicts the characters ABC upside down, as shown in FIG. 3. If the character recognition processor now scans the data in the memory in the reverse order, it will "recognize" the letters ABC and thus determine that the document was transmitted bottom edge first. What this means is that if the data is now read out of the memory in the reverse order, using the scanning sequence shown in FIG. 3, the top edge of the document will actually be printed first.

The question is how does the character recognition software know whether the data stored in the memory represents a document oriented as shown in FIG. 2 or a document oriented as shown in FIG. 3. That is a very simple matter. Using a brute force approach, the software can scan the data in the memory twice, once in the order shown in FIG. 2, and once in the order shown in FIG. 3. In one case characters will be recognized and in the other they won't. In those cases where there are actually some upside down characters on a page, it is simply a question of which scanning process gives rise to more recognizable characters.

It should be apparent, however, that it is really not necessary to scan the data representative of the entire document. It is sufficient to scan a small band. For example, the software may first detect "white" bands between lines of text. Thereafter, the software may scan the same band of text—a single line of characters—in the two directions depicted in FIGS. 2 and 3. One of the scans should result in far more recognizable characters than the other, and this determines the page orientation. In what would be the fastest scheme of all, a band of text could be scanned to recognize periods. Each period, since it is at the bottom of a line of text, is closer to one of the two white bands bounding a line of text than it is to the other. This in and of itself determines the page orientation. (Looking for an isolated dot may be fast, but it is hardly accurate. However, if a mistake is made, the worst that happens is that one page gets printed wrong edge first.)

It might be thought that documents could not be received and printed as fast as they otherwise could with the page reorientation processing. The reason for this is that all of the incoming data is stored in the memory, and then it is read out for printing purposes. Because the printing does not take place simultaneously with the transmission at the other end of the line, there is necessarily a delay. Unless a pair of memories is used, with one being read while the other is being written, while the printer 20 is operating, controller 12 must send a signal to the transmitting machine to tell it to wait before transmitting another document because memory 14 is still in use.

However, this is not the case, and additional memory is not required. As soon as data is read out of any memory location for printing purposes, new data can be stored in that location. Thus the transmitter can immediately transmit another document almost as soon as it finishes transmitting the first. If the character recognition software determines that the data must be read out of memory 14 in the reverse order, as depicted in FIG. 3, then the next document simply has to have its data stored in reverse order—with the first arriving data being stored in memory at a location which maps to the lower right of the documents depicted in FIGS. 2 and 3. Once the data is stored in the memory, the character recognition software does not care whether it was originally stored in the normal or the reverse order. After recognizing a page orientation, it controls read-out of the data using one of the two scanning sequences shown in FIGS. 2 and 3.

Figure 4:
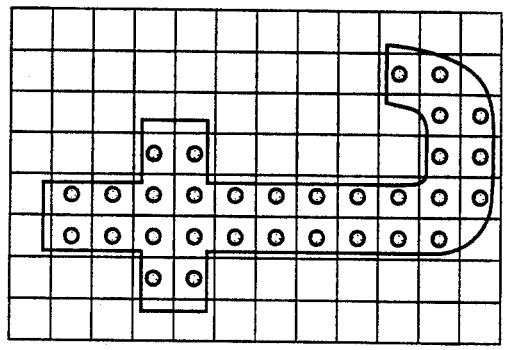
FIG. 4 depicts the manner in which an individual letter is mapped in memory.

FIG. 4 shows the bit map of the letter t as it appears in memory. During the transmission process, each character is in effect applied against a grid of pixels, and any individual pixel is a 1 if more than half of its area is "covered" by part of the letter. (The pixel array might be finer than that depicted in FIG. 4, and the drawing is symbolic only.) What is stored in memory 14 of FIG. 1 is such a bit map for the entire document. It is assumed that the image whose orientation is to be determined consists of text in horizontal, parallel lines. (The method can be extended to vertical scripts such as Japanese or Chinese.) It is further assumed that the image consists of black letters on a white background.

Figure 6:
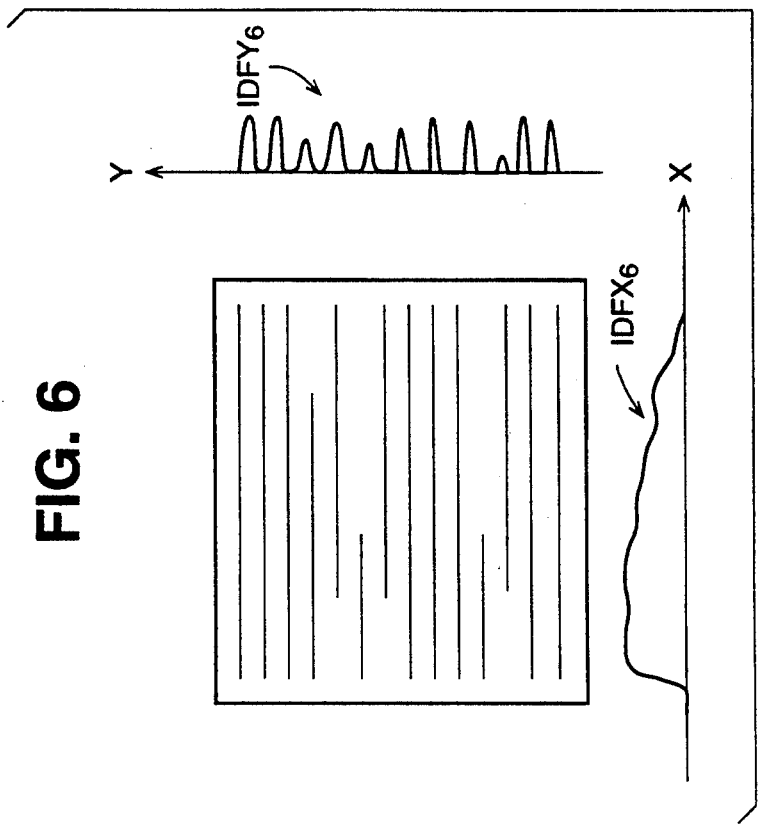
FIGS. 5 and 6 depict two different orientations for the same document, along with their respective X-axis and Y-axis Image Density Functions (IDF)

The first step in the overall method of the present invention is to reorient the image in memory so that the lines of text are horizontal. One reason for doing this is to correct skew of the document as it is represented in memory. In other words, while the received signal may represent a document such as that depicted in FIG. 5, it is desired to reorient the document and print it as shown in FIG. 6. Another reason for reorienting the document image is that the method of the invention for determining the orientation of the document and whether it has to be rotated 180 degrees requires scanning of lines which are parallel with lines of text.

In this regard, reference is made to U.S. Pat. No. 5,191,438 in the name of Katsurada et al, which patent is entitled "Facsimile Device With Skew Correction And Text Line Direction Detection" and issued on Mar. 2, 1993. This patent pertains to correcting the skew of a document and even an additional rotation by 90 degrees at a facsimile transmitter, rather than at a facsimile receiver. The reason for this is that facsimile transmission is more efficient if there are horizontal lines which are blank, or clear. To maximize the number of successive scan lines through clear areas of the document, skew corrections are made. Similarly, with languages such as Japanese, even though documents may be written in vertical lines, it is more efficient to transmit them after they are rotated by 90 degrees, and for this reason the Katsurada et al system corrects for skew and even makes an additional 90 degree rotation.

The way this is done is to scan along multiple lines and, depending on the results, to "rotate" the document in memory by manipulating all of the bits in accordance with well known mathematical algorithms. The correction for skew in my invention is similar, although it should be understood that the Katsurada et al technique could be used in its place.

Figure 5:
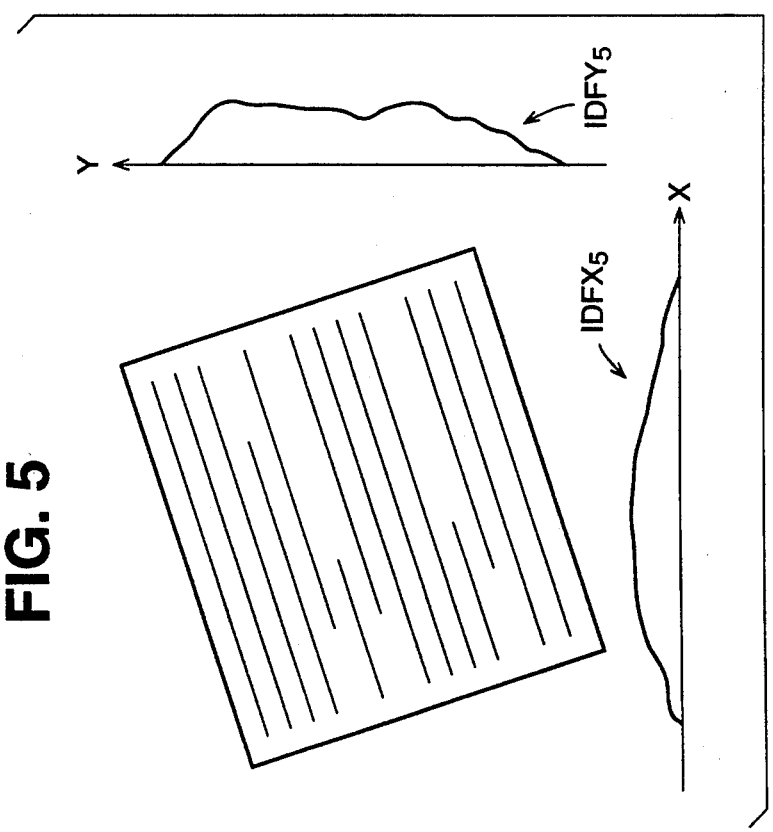

An Information Density Function (IDF) is simply a representation of the average density along horizontal segments of a document, or along vertical segments of a document. Referring to FIG. 5 for example, the Information Density Function along the vertical axis is identified by the letters $IDFY_5$. (The subscript 5 simply refers to the Figure number so that the plots of FIGS. 5 and 6 can be distinguished from each other.) Each value of this function (as measured in the horizontal direction as the distance between the vertical Y axis and the point at which the function itself is intersected) represents the amount of "darkness" along a horizontal line scan through the document. Similarly, the Image Density Function as measured along vertical segments is represented by the curve $IDFX_5$. In the case of a document represented by bit values in memory, there would be as many discrete values for each Image Density Function as there are columns or rows respectively of bits in the memory which represent the image. The function value for each row or column would simply be the number of 1s contained in that row or column.

The document of FIG. 6 is not skewed as is the document of FIG. 5, and the most notable difference between the two Information Density Functions for this document as compared with those for the document of FIG. 5 is that $IDFY_6$ has numerous peaks, and numerous regions where the Information Density Function is zero. This is because the lines are horizontal. For example, if there are ten scan lines through a line of text (corresponding to ten rows of memory pixels), then there will be ten adjacent values plotted in $IDFY_6$ which are large and give rise to what looks like a peak in the plot. The next ten scan lines might go through a clear band between lines of text, in which case all ten values of $IDFY_6$ would be zero. The plot of FIG. 6 exhibits numerous maxima and minima, as distinguished from that of the plot for FIG. 5, and it is by comparing IDFY functions that a document can be rotated in memory until its text lines are horizontal. The basic approach is to rotate the document (not physically, but by bit manipulation) until the IDFY function exhibits maximum "peakness."

Figure 7:
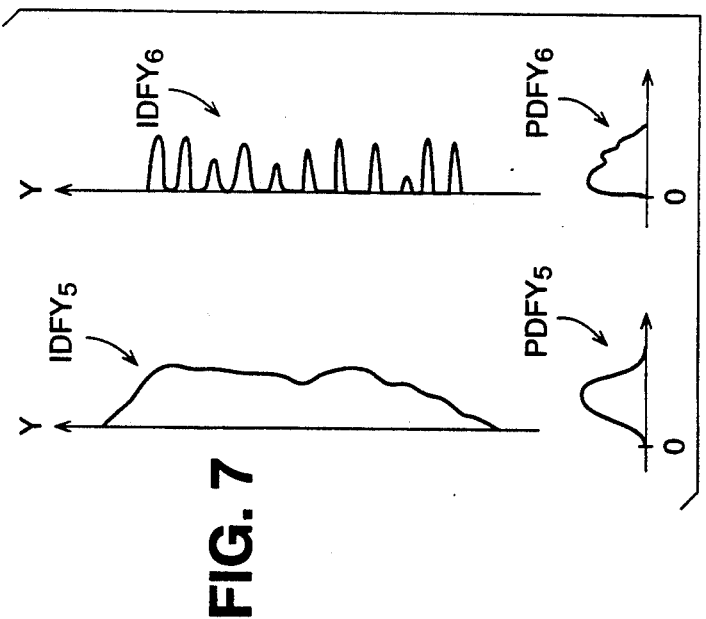
FIG. 7 depicts two Probability Density Functions (PDF) for the two Y-axis Image Density Functions of FIGS. 5 and 6.

The question is how to determine when the document has been rotated so that it has the most clearly defined maxima and minima. One way to do this is shown in FIG. 7.

The two functions $IDFY_5$ and $IDFY_6$ (representing the two orientations of the same document in FIGS. 5 and 6) are plotted side by side, and underneath each there is shown the respective probability density function, $PDFY_5$ or $PDFY_6$. A Probability Density Function is really another Information Density Function. The function $PDFY_5$ is derived by scan lines in the vertical direction through the $IDFY_5$ plot. Similarly, the $PDFY_6$ function is derived by taking scan lines in the vertical direction through the plot $IDFY_6$. The latter plot has numerous segments along the Y axis itself, corresponding to the clear bands between lines of text. Consequently, the $PDFY_6$ function exhibits a peak at a point corresponding to the Y axis itself. The peak in the $PDFY_5$ function is in a region corresponding to the top (on the right side) of the overall $IDFY_5$ plot. It is thus apparent that as a document is rotated in memory, all that is necessary to determine when the text lines have become horizontal is to determine when the PDFY function is a maximum at the far left of the curve. (In a sense, this is similar to performing a discrete Fourier transform analysis of the IDFY function as the document is rotated in memory, with the image being determined to be horizontal when there is a maximum high frequency content.)

The flow chart of FIG. 9 depicts the steps for rotating the document until the PDFY function is maximally skewed to the left (as depicted by $PDFY_6$), that is, until the leftmost value of PDFY is a maximum.

Referring to FIG. 9, the PDFY for the document stored in memory is calculated. This is represented by the symbol $PDFY_n$, where the subscript represents the current calculation. The current value of PDFY is then stored in a memory location which represents the previous value, $PDFY_{n-1}$. The reason for doing this is so that a new PDFY value can be calculated, represented by $PDFY_n$, so that the two of them can be compared. To do this, the image in memory is rotated one unit clockwise, for example, by using the same mathematical manipulations used in the above-identified Katsurada et al patent. After the $PDFY_n$ value for this new image position is calculated, the leftmost value of the function (represented by (0)) is compared with the leftmost value for the previous PDFY function. If the new leftmost value is larger, it is an indication that the rotation is moving in the direction which is increasing the "peakness" of the Image Density Function, i.e., it is sharpening the leftmost transition in the $PDFY_6$ function shown in FIG. 7. Accordingly, the program loops back, treats the new PDFY as the old one, calculates the new one after rotating the image an additional unit in the clockwise direction, and once again compares the two leftmost values. Eventually, $PDFY_{n-1}(0)$ will be greater than $PDFY_n(0)$.

When this happens, as a result of PDFY(0) values having increased as the image was rotated in the clockwise direction, but then having decreased after the last rotation, it means that the document was rotated one unit too far. What is now required is to rotate the image one unit in the counterclockwise direction because the previous image position was the one which had the most "perfect" horizontal lines.

It is also possible that the very first rotation in the clockwise direction is in the wrong direction, i.e., it makes the skew worse. In such a case, the very first inequality test results in an answer of "no" and the execution of the steps in the bottom half of FIG. 9. In this case, there may be several counterclockwise rotations which are necessary until the maximum PDFY(0) value is achieved.

Consider first the case in which successive clockwise rotations produced increasing PDFY(0) values during successive loops around the upper half of the flow chart of FIG. 9. When the first "no" answer results, the processing in the bottom half of the flow chart begins. The processing here is very similar to that in the upper half except that the image rotation is in the opposite direction. The very first rotation in the counterclockwise direction will now return the document to its previous position with a maximum PDFY(0). Consequently, the inequality test is answered "yes". No more looping is necessary, but in order to use the same software for all cases, a loop is taken back where one more counterclockwise rotation takes place. This time the inequality is answered "no" and the processing has concluded. Because of the additional counterclockwise rotation made at the end of the testing, which actually increased the skew, the last step of the processing is to rotate the image one unit in the clockwise direction so that the final orientation of the document is that with maximally horizontal text lines.

Consider now the case in which the first attempt at clockwise rotation results in degradation of the peakness of the IDFY function. After the first inequality test is answered "no", an entry is made into the loop in the bottom half of the flow chart. This time, counterclockwise rotations take place, and presumably the PDFY(0) value keeps increasing, with each increase causing a loop back and the rotation in the counterclockwise direction by one more unit. Eventually, the bottom inequality in FIG. 9 is answered in the negative. This only happens after the last counterclockwise rotation has caused a decrease to take place in the PDFY(0) value. In order to return the document to the orientation with maximally horizontal text lines, the last step in the processing is to rotate the image one unit in the clockwise direction. (For a document which initially is aligned correctly, the upper loop causes one clockwise rotation, the bottom loop causes two counterclockwise rotations, and the last step restores everything with a clockwise rotation.)

All of this pre-processing is designed to obtain in the memory a representation of a document with maximally horizontal lines. The object of the invention, however, to determine whether the document has to be rotated 180 degrees, has not yet been accomplished. This is done by the method depicted in FIG. 10. But before considering how this is done, reference should be made to FIG. 8 which depicts several letters.

Figure 8:
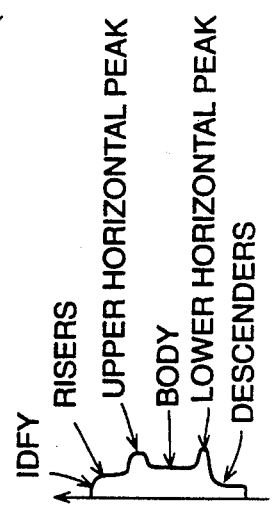
FIG. 8 depicts several letters which illustrate why Image Density Functions differ for line scans through the top and bottom regions of a line of text.

If scan lines are taken through the letters of FIG. 8 and an IDFY function is formed, the function can be divided into five regions. The risers section represents the densities along scan lines at the top of a line of text. These line scans intersect the tops of letters such as t, h, d and l, and the dots at the top of an i or a j. Similarly, the descenders part of IDFY represents line intersections through descenders such as those associated with the letters g and j.

The upper horizontal peak of the IDFY function corresponds to scan lines through the tops of letters such as e, o, m and r. Similarly, the lower horizontal peak corresponds to scan lines through the bottoms of letters such as s, d and b. Finally, the body of the IDFY function corresponds to scan lines through the central section of the line of text.

Because there are more risers than descenders, it is expected that the IDFY function associated with any line of text will have a greater area under the risers portion of the IDFY function than under the descenders portion. Thus in order to determine whether a line of text, and therefore the overall document, is represented right side up or upside down in memory, all that is necessary is to compare the area under the risers portion with the area under the descenders portion. If the former is larger, the document is oriented correctly. If the opposite is true, then the document has to be rotated 180 degrees (by reading the pixel information in reverse order, as discussed above).

The flow chart of FIG. 10 depicts the processing. Using the final rotated image, the system first determines the density for each of a selected number of successive line scans, for example, a number of lines corresponding to pixels in all of the rows required to represent two lines of text and two clear bands. From these density values, N successive values representative of a clear band are located. (N must be less than the number of scan lines through a clear band.)

After locating a clear band on the image, the system, in the third step, looks for the closest clear band. The reason it does so is that the non-clear band between the two clear bands most likely represents a line of text. As indicated in the flow chart, the closest group of N successive density values which are representative of clear lines should not be connected with the first group. That is the only way in which the system can be certain that it has isolated a line of text.

All of this is represented in the fourth step of FIG. 10. Once the two groups of clear lines are located, the system has identified the band of successive line scans between these two groups, the density values for which correspond to the IDFY curve for FIG. 8 (the fifth step). In the last step, the areas under the risers and descenders parts of the IDFY function are compared in order to determine the image orientation.

The actual processing of FIG. 10 is straightforward, and is most conveniently implemented under microprocessor control. Once horizontal lines of text are bit mapped in the memory, the processing is relatively simple. The basic steps involve looking at the average densities of scan lines through the top region of a text line and the bottom region of a text line. Whichever group of line scans have an overall higher average density is the group of scan lines associated with the upper edge of the characters. That is all the system must know in order to determine how the page should be printed.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A facsimile machine for printing received documents with their corresponding edges aligned comprising a memory; means for storing in said memory data representative of a received document; control means for identifying at least one line of text as represented by data in said memory, calculating the average densities of scan lines along the top and bottom edges of the text line, and comparing the average densities of the scan lines at the top and bottom edges of the text line to determine whether the document represented by said data had its top or bottom edge transmitted first; printing means; means for reading data out of said memory to control said printing means to print a document; and means for determining whether the data is read out of said memory in the order in which it was stored or the reverse order in accordance with the operation of said control means so that all documents printed have their corresponding edges aligned.

2. A facsimile machine for printing received documents with their corresponding edges aligned comprising a memory; means for storing in said memory data representative of a received document; means for operating on the data in said memory to determine the relative densities of scan lines along the top and bottom edges of text lines in said document; printing means; means for reading data out of said memory to control said printing means to print a document; and means for determining whether the data is read out of said memory in the order in which it was stored or the reverse order in accordance with the operation of said operating means so that all documents printed have their corresponding edges aligned.

3. A facsimile machine in accordance with claim 2 wherein said operating means further operates on the data in said memory, prior to determining said relative densities, to reflect the rotation of a represented document so that skew errors are corrected.

4. A facsimile machine in accordance with claim 3 wherein, in order to correct skew errors, said operating means calculates image density functions for line scans through a represented document.

5. A method for operating a facsimile machine to print received documents with their corresponding edges aligned comprising the steps of storing in a memory data representative of a received document, identifying at least one line of text as represented by data in said memory and calculating the average densities of scan lines along the top and bottom edges of the text line, and comparing the average densities of the scan lines at the top and bottom edges of the text line to determine whether the document represented by said data had its top or bottom edge transmitted first, reading data out of said memory to control printing of a document, and determining whether the data is read out of said memory in the order in which it was stored or the reverse order in accordance with the result of said comparing step so that all documents printed have their corresponding edges aligned.

6. A method for operating a facsimile machine to print received documents with their corresponding edges aligned comprising the steps of storing in a memory data representative of a received document, operating on the data in said memory to determine the relative densities of scan lines along the top and bottom edges of text lines in said documents, reading data out of said memory to control printing of a document, and determining whether the data is read out of said memory in the order in which it was stored or the reverse order in accordance with said relative densities so that all documents printed have their corresponding edges aligned.

7. A method in accordance with claim 6 wherein in said operating step, the data in said memory, prior to said relative densities being determined, is adjusted to reflect the rotation of a represented document so that skew errors are corrected.

8. A method in accordance with claim 7 wherein, in order to correct skew errors, in said operating step image density functions are calculated for line scans through a represented document.

9. A method for operating a facsimile machine to print received documents with their corresponding edges aligned comprising the steps of storing in a memory data representative of a received document, operating on the data in said memory to determine the orientation of a represented document without recognizing specific characters in said document, and determining which end of a represented document is to be printed first in accordance with the result of said operating step so that all documents printed have their corresponding edges aligned.

10. A method in accordance with claim 9 wherein in said operating step, the data in said memory, prior to said orientation being determined, is adjusted to reflect the rotation of a represented document so that skew errors are corrected.

* * * * *